(12) United States Patent
Mawer (10) Patent No.: US 9,797,301 B2
(45) Date of Patent: Oct. 24, 2017

(54) VALVE ASSEMBLY WITH CYLINDER HAVING THROUGH HOLES

(71) Applicant: BorgWarner Inc., Auburn Hills, MI (US)

(72) Inventor: James Mawer, Harrogate (GB)

(73) Assignee: BorgWarner Inc., Auburn Hills, MI (US)

( * ) Notice: Subject to any disclaimer, the term of this patent is extended or adjusted under 35 U.S.C. 154(b) by 58 days.

(21) Appl. No.: 14/442,235

(22) PCT Filed: Nov. 4, 2013

(86) PCT No.: PCT/US2013/068259
§ 371 (c)(1),
(2) Date: May 12, 2015

(87) PCT Pub. No.: WO2014/078109
PCT Pub. Date: May 22, 2014

(65) Prior Publication Data
US 2016/0298533 A1 Oct. 13, 2016

Related U.S. Application Data

(60) Provisional application No. 61/726,174, filed on Nov. 14, 2012.

(51) Int. Cl.
*F02B 37/18* (2006.01)
(52) U.S. Cl.
CPC .......... *F02B 37/186* (2013.01); *F02B 37/183* (2013.01); *Y02T 10/144* (2013.01)

(58) Field of Classification Search
CPC ..... F02B 37/183; F02B 37/186; Y02T 10/144
See application file for complete search history.

(56) References Cited

U.S. PATENT DOCUMENTS

| 3,270,951 | A | * | 9/1966 | Reed | F01D 17/105 |
| | | | | | 137/501 |
| 4,245,953 | A | * | 1/1981 | Milton | F01D 17/105 |
| | | | | | 415/144 |
| 4,418,535 | A | * | 12/1983 | Ecomard | F02B 37/183 |
| | | | | | 137/115.21 |
| 4,655,040 | A | | 4/1987 | Parker | |
| 4,662,342 | A | * | 5/1987 | Altmann | F04F 13/00 |
| | | | | | 123/559.2 |
| 2003/0000211 | A1 | * | 1/2003 | Drangel | F01D 17/143 |
| | | | | | 60/602 |

(Continued)

FOREIGN PATENT DOCUMENTS

DE 102011014120 A1 9/2012
JP 2000274254 10/2000

*Primary Examiner* — Audrey K Bradley
(74) *Attorney, Agent, or Firm* — Young Basile Hanlon & MacFarlane, P.C.

(57) ABSTRACT

A turbocharger (10) that uses exhaust gas flow to drive a turbine wheel (12) having a barrel or piston-type wastegate valve assembly (26, 126) with a wastegate valve (28, 128) that controls exhaust gas flow bypassing the turbine wheel (12) to control turbine work. A cylinder (30, 130), which may have a through hole (32, 132), is moveable in a tubular chamber (22) and functionally operates with a wastegate port (24) in the turbine housing (20) for controlling exhaust gas flow. An actuator (36, 136) operably controls movement of the cylinder (30, 130).

14 Claims, 9 Drawing Sheets

(56) References Cited

U.S. PATENT DOCUMENTS

| | | |
|---|---|---|
| 2007/0204616 A1 | 9/2007 | Martin et al. |
| 2009/0211247 A1 | 8/2009 | Mcewan et al. |
| 2010/0300090 A1 | 12/2010 | Kratschmer et al. |
| 2011/0000208 A1* | 1/2011 | Robinson .............. F02B 37/001 60/602 |
| 2011/0123315 A1* | 5/2011 | Robinson .............. F02B 37/004 415/145 |
| 2012/0148386 A1 | 6/2012 | Lombard et al. |

* cited by examiner

VALVE ASSEMBLY WITH CYLINDER HAVING THROUGH HOLES

CROSS-REFERENCE TO RELATED APPLICATION

This application claims priority to and all the benefits of U.S. Provisional Application No. 61/726,174, filed on Nov. 14, 2012 and entitled "Valve Assembly with Cylinder Having Through Holes."

BACKGROUND

Field of the Disclosure

This disclosure relates to components for turbochargers driven by exhaust gas. More particularly, this disclosure relates to barrel or piston type wastegate valve designs with a cylinder having a through hole used in a turbine housing.

Description of Related Art

Advantages of turbocharging include increased power output, lower fuel consumption and reduced pollutant emissions. The turbocharging of engines is no longer primarily seen from a high power performance perspective, but is rather viewed as a means of reducing fuel consumption and environmental pollution on account of lower carbon dioxide ($CO_2$) emissions. Currently, a primary reason for turbocharging is using exhaust gas energy to reduce fuel consumption and emissions. In turbocharged engines, combustion air is pre-compressed before being supplied to the engine. The engine aspirates the same volume of air-fuel mixture as a naturally aspirated engine, but due to the higher pressure, thus higher density, more air and fuel mass is supplied into a combustion chamber in a controlled manner. Consequently, more fuel can be burned, so that the engine's power output increases relative to the speed and swept volume.

In exhaust gas turbocharging, some of the exhaust gas energy, which would normally be wasted, is used to drive a turbine. The turbine includes a turbine wheel that is mounted on a shaft and is rotatably driven by exhaust gas flow. The turbocharger returns some of this normally wasted exhaust gas energy back into the engine, contributing to the engine's efficiency and saving fuel. A compressor, which is driven by the turbine, draws in filtered ambient air, compresses it, and then supplies it to the engine. The compressor includes a compressor impeller that is mounted on the same shaft so that rotation of the turbine wheel causes rotation of the compressor impeller.

Turbochargers typically include a turbine housing connected to the engine's exhaust manifold, a compressor housing connected to the engine's intake manifold, and a center bearing housing coupling the turbine and compressor housings together. The turbine wheel in the turbine housing is rotatably driven by an inflow of exhaust gas supplied from the exhaust manifold.

This disclosure focuses on a wastegate valve disposed in the turbine housing of turbochargers. A wastegate (WG) valve assembly includes a valve, vent and/or bypass that is able to route a significant portion (an example being about 30 percent) of the exhaust gas around (i.e. bypassing) the turbocharger turbine, in order to limit/control turbine work, thus only utilizing a fraction of the available exhaust energy when appropriate. Thereby, the WG valve assembly regulates exhaust gas flow and ensures that the turbine wheel is not spun at an undesirable speed.

For a fixed geometry turbocharger (i.e. no WG), the turbine must be chosen such that at rated conditions (high engine speed, max power), the turbine wheel speed is not excessive. However, this usually means that at peak torque condition (medium engine speed, max torque), the turbine housing is undesirably large, impacting negatively on transient response and engine torque. To strike a better compromise between peak torque and rated conditions, a wastegate is often employed. A wastegate selectively allows a portion of the exhaust gas flow to bypass the turbocharger, specifically the turbine, thereby governing the amount of energy that is extracted from the available exhaust gas flow.

Decreasing the amount of opening of the wastegate valve reduces the amount of exhaust gas flow that is allowed to bypass the turbine, which should increase pressure of the air entering the intake manifold. An actuator for the valve can adjust whether exhaust gas bypasses the turbine through the wastegate.

A wastegate valve may be operated in a conventional way, for instance by a pneumatic actuator or electric actuator to allow some of the exhaust gas flow to bypass the turbine. As a result of higher demands and increased loads, the exhaust temperatures, pressure conditions, and stress on wastegate valves and actuators have increased.

Conventional wastegate valves can be complex with numerous parts. Such wastegate valves substantially operate in an on/off function.

SUMMARY

The disclosure provides for wastegate valve assemblies having a wastegate valve such as a moveable cylinder with a through hole. A cylinder may be adapted for a rotary version of a roller barrel valve or a reciprocating version of a piston valve. The roller barrel valve has a transverse through hole, which rotates within a tubular chamber. The piston valve linearly reciprocates within a tubular chamber with various features to control exhaust gas flow. In one embodiment of the piston valve, the cylinder may also include a transverse through hole, including an external radial groove, to control exhaust gas flow.

The wastegate valve disposed in the turbine housing is a valve that vents or bypasses a significant portion of the engine exhaust gas flow around the turbine, to limit/control turbine work. By selectively allowing exhaust gas flow to bypass the turbine, the turbocharger only uses a fraction of the available exhaust energy when appropriate. Thereby, the wastegate valve also ensures that the turbine wheel is not spun at an undesirable speed.

Wastegate valves including the roller barrel valve may have transverse through holes, such as tear drop holes in the barrel, for modulation or precise movement. The holes provide an adjustable passage for exhaust gas flow. A key advantage of full through holes is having precise control over the valve behaviour at the point of lift off.

The barrel itself may be solid with the through holes as a passage, rather than hollow cylindrical designs where gas enters radially and exits axially.

The through holes in a rotating or reciprocating barrel can lower cost. The net reaction loads on the barrel are low due to the through holes. This means that a smaller and likely less expensive actuator can be used. Additionally, actuator durability may be enhanced since operating loads are all reduced. The barrel concept with through holes is also expected to help combat hysteresis, in particular, when used with a conventional pneumatic actuator.

The piston valve is a substantially solid cylinder that slides with linear movement relative to the wastegate port for precise control of exhaust gas flow. The through hole can align with a center axis of the cylinder in which a piston rod may secure the cylinder in an embodiment where the cylinder blocks and a distal end of the cylinder allows passage of exhaust gas flow. The piston valve may alternately or additionally include a transverse through hole for passage of exhaust gas flow.

The advantages of a substantially solid cylinder with through holes over conventional valve assemblies include:

the barrel design, especially with shaped (i.e. tear drop) holes, and the piston design with varying length of reciprocation can be modulated, whereas a conventional valve is substantially on or off;

exhaust gas pressure will exert minimal net torque/load on the barrel or piston valves, which means that much smaller and less expensive electronic actuators can be used. With a conventional pneumatic actuator, lower loads should mean greatly reduced wear and improved durability/life;

reduced actuation loads may eliminate the need for a conventional actuator linkage and associated mechanical advantage afforded toward a "valve closed" position;

the barrel valve or piston valve have lower complexity and less parts than a conventional wastegate valve assembly;

barrel-type or piston-type wastegate valve assemblies should be less expensive to make and easier to assemble compared to a conventional wastegate valve assembly; and the barrel valve would not need to be manipulated/fitted via the turbine housing wastegate cavity or port, which means that the size of the cavity could be significantly reduced and a wastegate cover plate and associated machining/cost redundant.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION OF THE EMBODIMENTS

A turbocharger 10 is generally known wherein a compressor impeller is rotatably driven via a shaft by a turbine wheel 12 in a turbine housing 20. While exhaust gas flow is used to drive the turbine wheel 12, often some exhaust gas flow may be allowed to bypass the turbine wheel 12 to control turbine work.

The turbine housing 20 may include a tubular chamber 22 and a wastegate port 24 for exhaust gas flow bypassing the turbine wheel 12. A wastegate valve assembly 26, 126 may include a valve 28, 128 moveable within the tubular chamber 22 of the turbine housing 20 that selectively blocks the wastegate port 24 to control exhaust gas flow through the wastegate port 24. The valve 28, 128 is moveable with respect to the wastegate port 24 for blocking and unblocking the wastegate port 24 thereby controlling the exhaust gas flow, wherein some exhaust gas flow can bypass the turbine wheel 12 to control turbine work in that the turbine wheel 12 rotates at controlled speeds.

The wastegate valve assembly 26, 126 is used to control exhaust gas flow bypassing the turbine wheel 12. The wastegate valve 28, 128 disposed in the turbine housing 20 is a valve that vents or bypasses a significant portion of the exhaust gas flow around the turbine wheel 12, to limit/ control turbine work. By selectively allowing exhaust gas flow to bypass the turbine wheel 12, the turbocharger 10 only uses a fraction of the available exhaust energy when appropriate. Thereby, the wastegate valve 28, 128 bypassing excessive exhaust gas flow also ensures that the turbine wheel 12 is not spun at an undesirable speed.

The wastegate valve 28, 128 may be configured to selectively allow exhaust gas flow to bypass the turbine wheel 12. The wastegate valve 28, 128 includes a cylinder 30, 130 having a through hole 32, 132. The cylinder 30, 130 is preferably solid except for the through hole 32, 132. The wastegate valve 28, 128 controls the exhaust gas flow by changing the amount or size of the path for the exhaust gas flow.

An actuator 36, 136 is operably connected to the wastegate valve 28, 128 and is constructed and arranged to move the wastegate valve 28, 128 with respect to the wastegate port 24 to control the exhaust gas flow therethrough. The actuator 36, 136 operably controls movement of the cylinder 30, 130.

Figure 1:
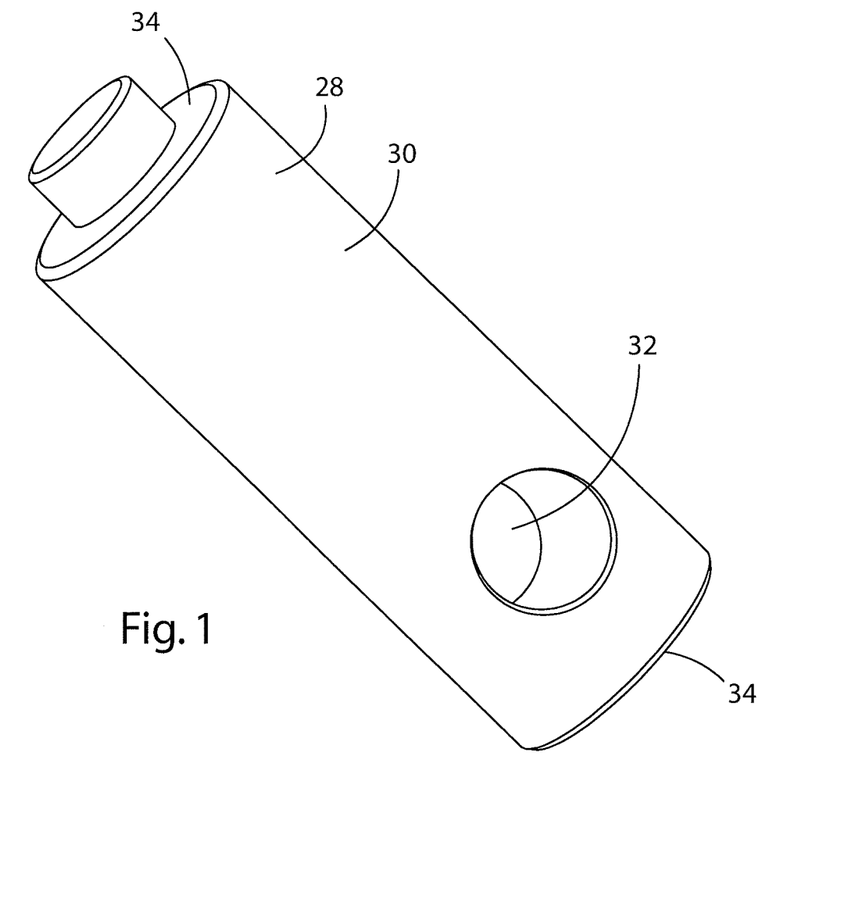
FIG. 1 is a perspective view of a wastegate valve configured as a cylinder with a through hole.
Figure 2:
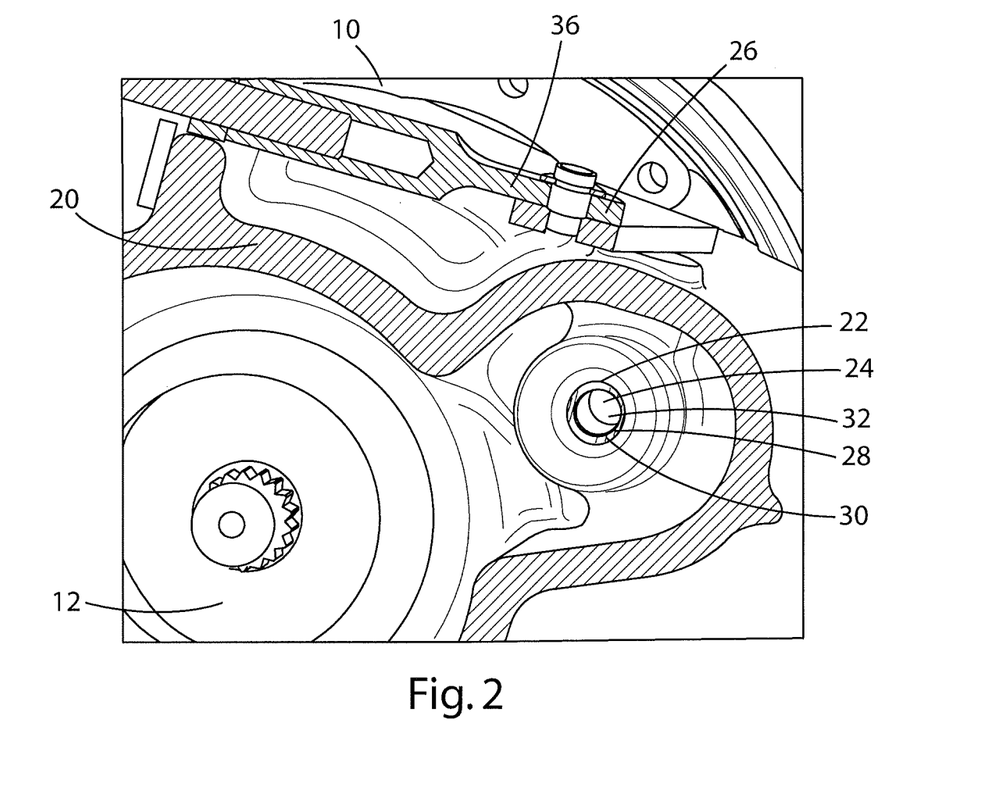
FIG. 2 is a cross-sectional view of a portion of a turbine housing including a barrel-type wastegate valve assembly with a roller barrel valve in an open position.

As shown in FIGS. 1-4, the barrel-type wastegate valve assembly 26 includes the cylinder 30 being the wastegate or roller barrel valve 28 with the through hole 32 extending transversely therethrough. As shown in FIGS. 1 and 2, the through hole 32 extends transversely directly across a diameter of the cylinder 30. The cylinder 30 is solid as shown except for the through hole 32, and the cylinder 30 has solid parallel end planes 34. Such cylinder 30 may be adapted for a rotary version of the roller barrel valve 28.

The cylinder 30 as the roller barrel valve 28 rotates within the tubular chamber 22 of the turbine housing 20 and the through hole 32 form a passage for exhaust gas flow through the wastegate port 24. The through hole 32 aligns with the wastegate port 24 so that when rotated with the through hole 32 aligned, a passage is open. The roller barrel valves 28 may have one or possibly more transverse through holes 32, such as tear drop hole(s) in the cylinder 30, for modulation or precise movement and control. The through hole 32 when aligned or partially aligned with the wastegate port 24 is used as a passage for exhaust gas flow.

The actuator 36 can be an electric actuator which can be operably connected to the roller barrel valve 28 and constructed and arranged to rotate the roller barrel valve 28 so the through hole 32 creates openings to control the exhaust gas flow therethrough. In addition, the actuator 36 can be a standard pneumatic actuator which can be used with less stress than with other valve assemblies. The actuator 36 is preferably part of or embodied in a larger system that controls other functional components of the turbocharger 10.

Figure 3:
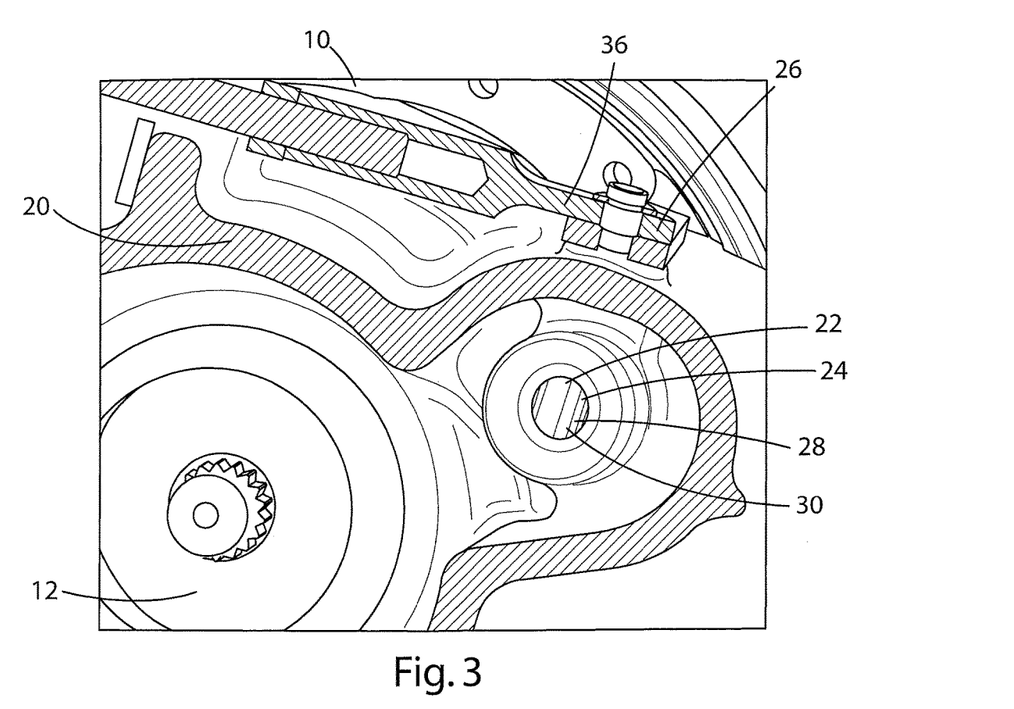
FIG. 3 is a cross-sectional view of a portion of the turbine housing including the barrel-type wastegate valve assembly with the roller barrel valve in a closed position.
Figure 4:
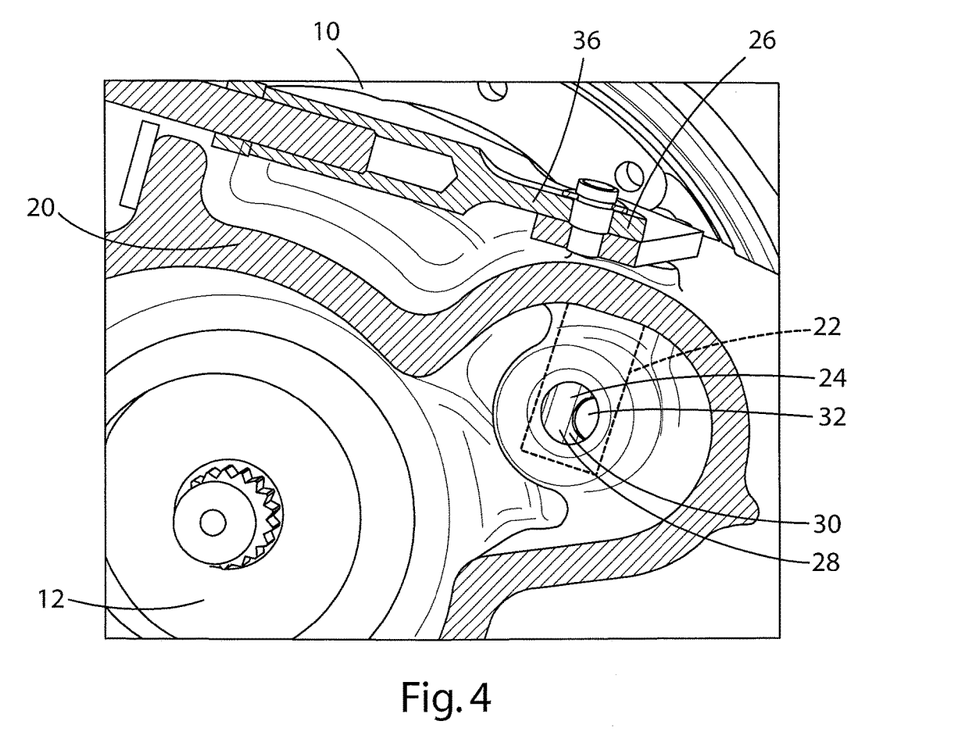
FIG. 4 is cross-sectional view of a portion of the turbine housing including the barrel-type wastegate valve assembly with the roller barrel valve in an intermediate position.

The roller barrel valve 28 is constructed and arranged so the cylinder 30 is moveable to at least a first position and a second position so that in the first position, the wastegate port 24 is fully open, and in the second position, the wastegate port 24 is closed. FIG. 2 shows the roller barrel valve 28 in an open position with the through hole 32 aligned with the wastegate port 24 to allow exhaust gas flow to flow through the wastegate port 24. FIG. 3 shows the roller barrel valve 28 in a closed position with a solid portion of the cylinder 30 blocking the wastegate port 24 to preclude exhaust gas flow from flowing through the wastegate port 24. In intermediate positions, for example, in FIG. 4, the cylinder 30 with the through hole 32 is at least partially aligned with the wastegate port 24 so that the through hole 32 is partially open.

The cylinder 30 can also reciprocate within the tubular chamber 22 of the turbine housing 20, and the through hole 32 forms a passage for exhaust gas flow through the wastegate port 24. Rather than the cylinder 30 rotating for the through hole 32 to be aligned with the wastegate port 24, the cylinder 30 linearly slides as a piston valve to align the through hole 32 with the wastegate port 24.

Figure 5:
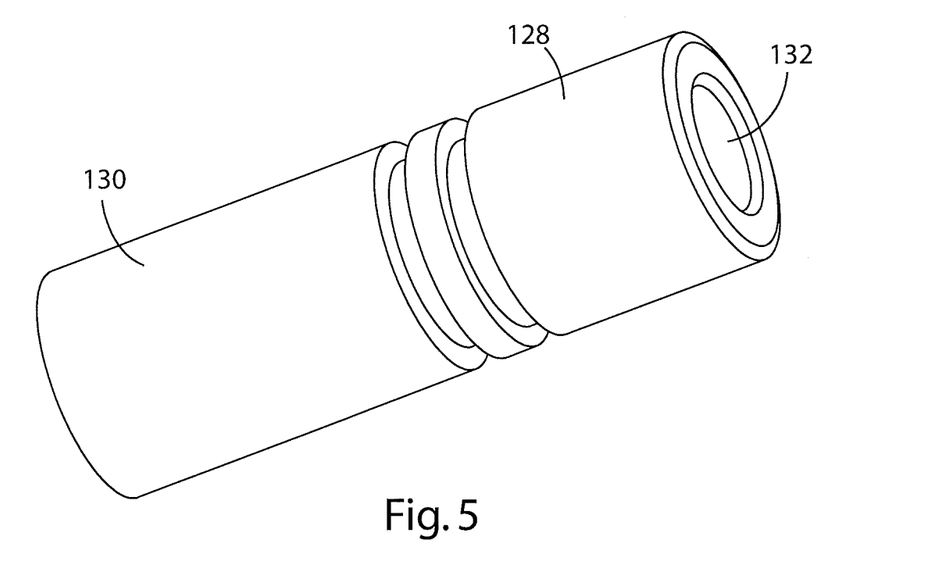
FIG. 5 is a perspective view of a wastegate valve configured as a cylinder with an axial through hole.
Figure 6:
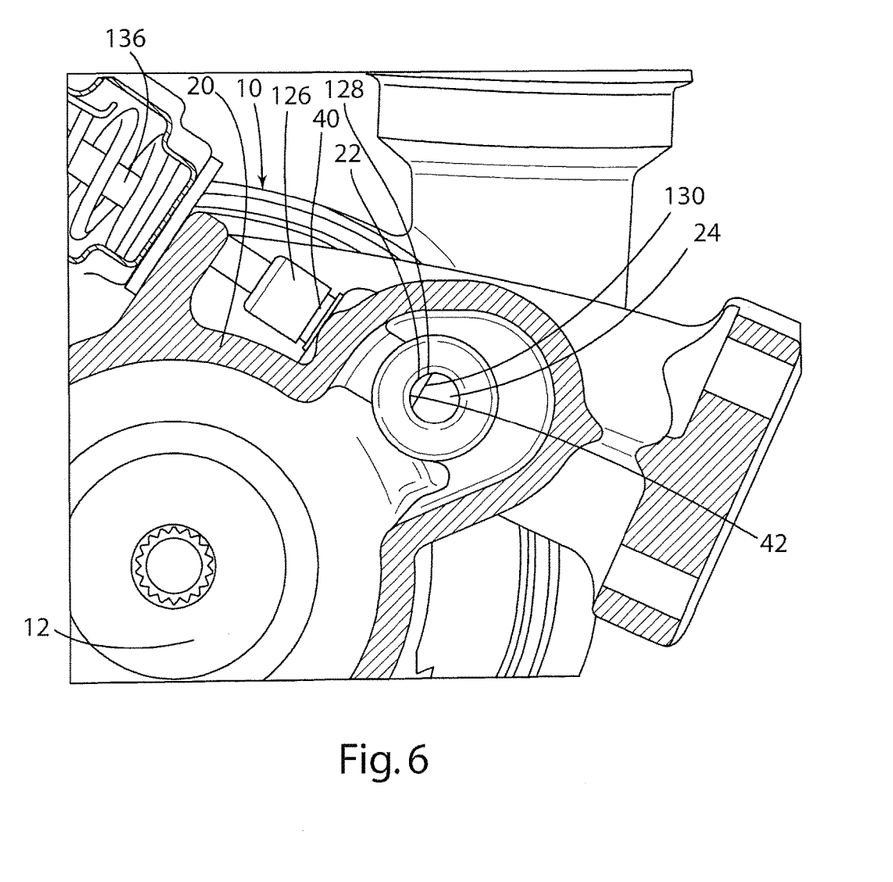
FIG. 6 is a cross-sectional view of a portion of a turbine housing including a piston-type wastegate valve assembly with a piston valve in an open position.

As shown in FIGS. 5-6, the piston-type wastegate valve assembly 126 includes a piston, wastegate, or roller barrel valve 128 which operates in reciprocating fashion. The cylinder 130 is a solid plunger and slides with linear movement in the tubular chamber 22 with respect to the wastegate port 24 for precise control of exhaust gas flow. An optional axial through hole 132 can align with the center axis of the cylinder 130 in which a piston rod 40 is received to secure the cylinder 130. It is possible that exhaust gas flow could pass through the axial through hole 132 if the piston rod 40 does not fully enclose the axial through hole 132. A distal end 42 of the cylinder 130 selectively blocks the wastegate port 24 to control exhaust gas flow.

The linear actuator 136 is operably connected to the piston valve 128 and constructed and arranged to reciprocate the piston valve 128 with respect to the wastegate port 24 to control the exhaust gas flow. The linear actuator 136 operably controls linear movement of the cylinder 30 and/or 130.

The actuator 136, preferably electric, is operably connected to the piston valve 128. The actuator 136 is constructed and arranged to slide the cylinder 30 or 130 so the through hole 32 of the cylinder 30 or the distal end 42 of the cylinder 130 blocks or makes an opening to control the exhaust gas flow through the wastegate port 24. A standard pneumatic actuator can be used with less load than with other wastegate valves. The actuator 136 is preferably part of or embodied in a larger system that controls other functional components of the turbocharger 10.

FIG. 6 shows the piston valve 128 in an open position with the distal end 42 of the cylinder 130 barely visible allowing exhaust gas flow to flow through the wastegate port 24.

Figure 7:
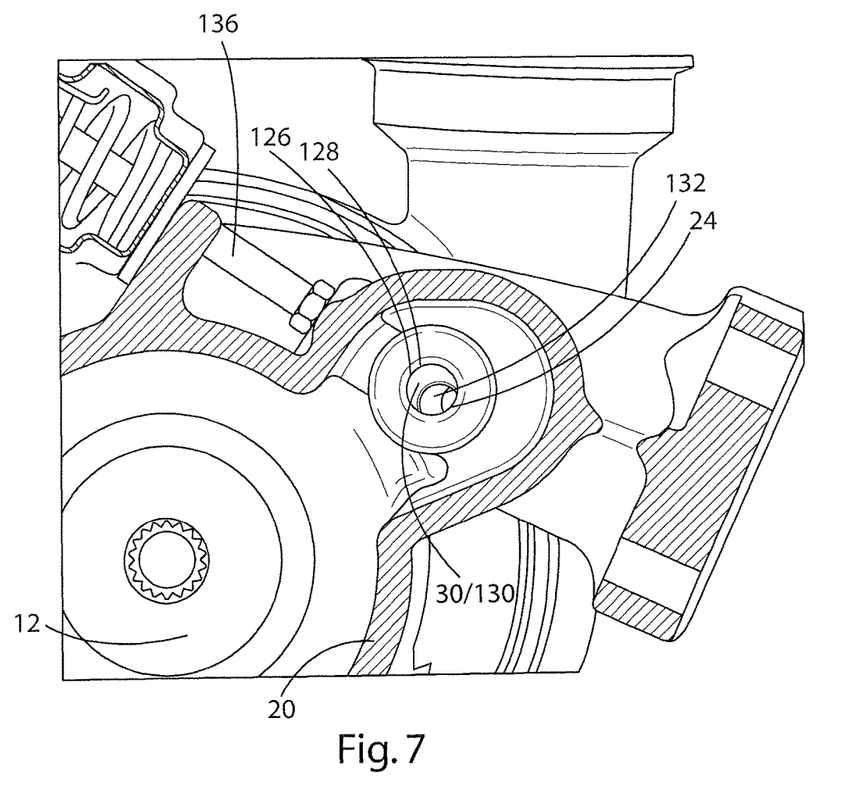
FIG. 7 is a cross-sectional view of a portion of the turbine housing including the piston-type wastegate valve assembly with another piston valve in a partially open position.

FIG. 7 shows the piston valve 128 in a partially open position. This embodiment shows the cylinder 30/130 having the transverse through hole 132 partially blocking the wastegate port 24, but allowing for some exhaust gas flow through the wastegate port 24.

Figure 8:
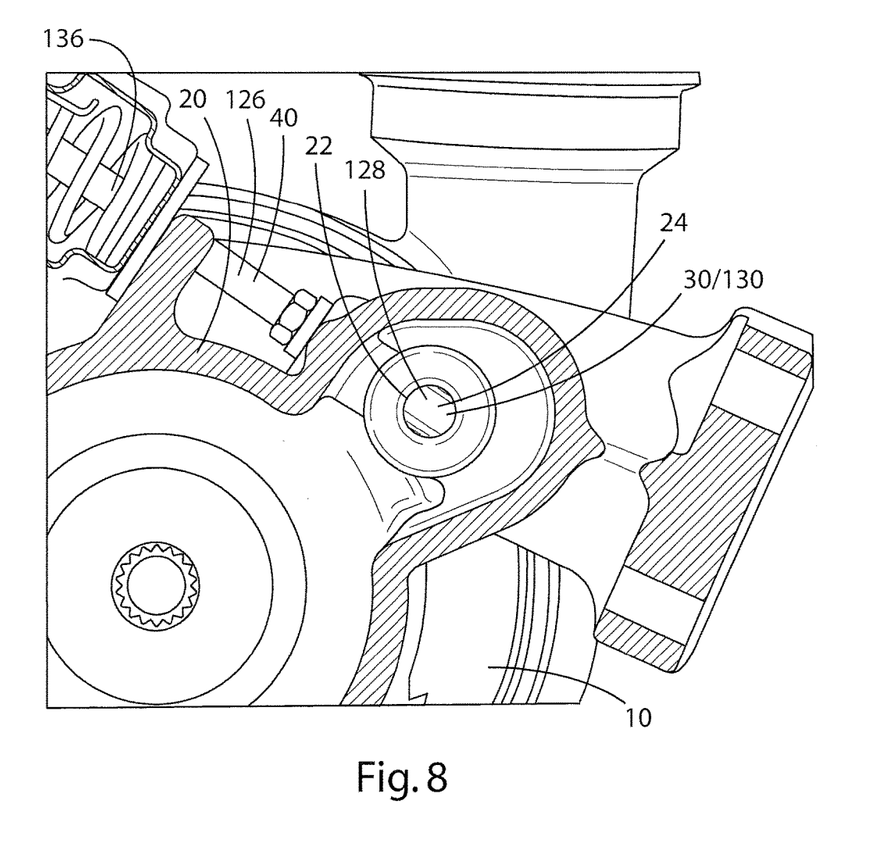
FIG. 8 is a cross-sectional view of a portion of the turbine housing including the piston-type wastegate valve assembly with the piston valve in a closed position.

FIG. 8 shows the piston valve 128 in a closed position with the cylinder 30 or 130 completely blocking the wastegate port 24. It is understood that the cylinder 30 of FIG. 1 could linearly reciprocate from this closed position so the transverse through hole 32 could allow passage of exhaust flow. As shown in FIG. 8, the transverse through hole 32 could be on either side of the wastegate port 24 within the tubular chamber 22. In the embodiment with the cylinder 130 not having a transverse through hole, the cylinder 130 can be slid in intermediate linear positions partially blocking the wastegate port 24 with the distal end 42 of the cylinder 130 for precise control of exhaust gas flow.

Figure 9:
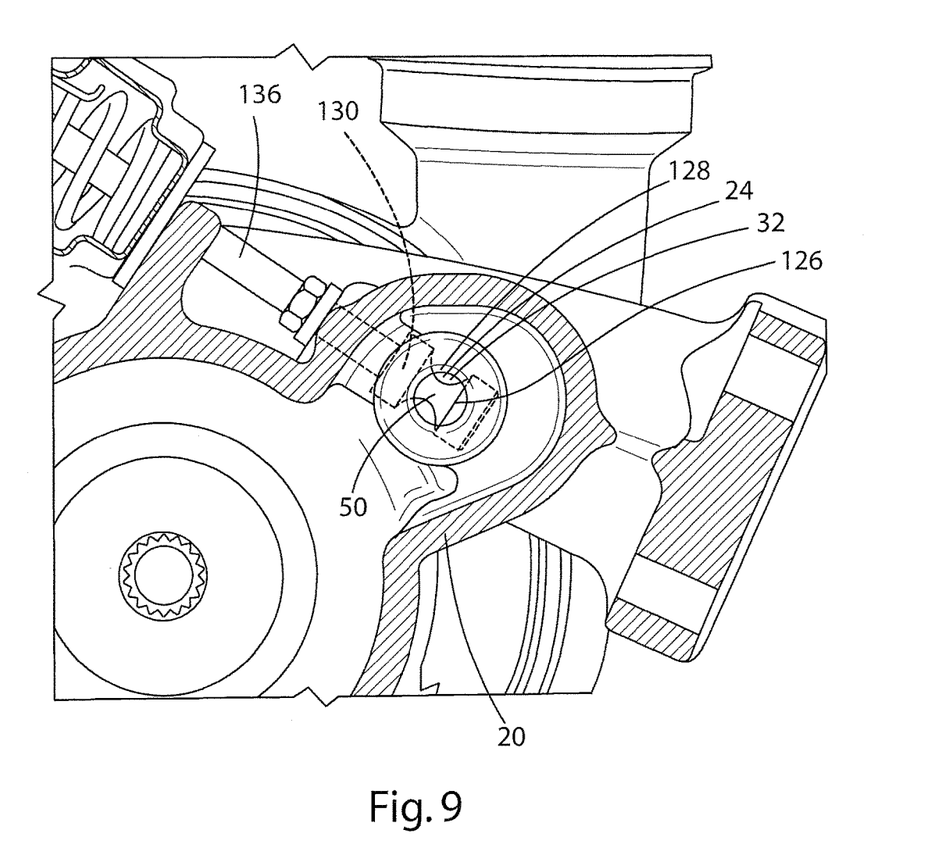
FIG. 9 is a cross-sectional view of a portion of a turbine housing showing a partially hidden piston valve in broken lines having a transverse through hole as an external radial groove inside a wastegate port.

FIG. 9 shows the turbine housing 20 having the piston valve 128 with the transverse through hole 32 formed as an external radial groove. A center stem 50 allows exhaust gas flow through the wastegate port 24 on each side via the through hole 32.

The invention has been described in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed is:

1. A turbocharger (10) using exhaust gas flow to drive a turbine wheel (12) in a turbine housing (20) and a wastegate valve assembly (26, 126) to control exhaust gas flow bypassing the turbine wheel (12), the turbocharger (10) comprising:
   a tubular chamber (22) and a wastegate port (24) in the turbine housing (20), and the wastegate port (24) having a longitudinal axis for exhaust gas flow bypassing the turbine wheel (12);
   a valve (28, 128) including a cylinder (30, 130) having a through hole (32, 132) and a longitudinal axis, the cylinder (30, 130) moveable within the tubular chamber (22) of the turbine housing (20) and operably associated with the wastegate port (24) wherein the longitudinal axis of the cylinder (30, 130) intersects and is perpendicular to the longitudinal axis of the wastegate port (24) for selectively blocking and unblocking the wastegate port (24), thereby controlling the exhaust gas flow, and wherein the through hole (32, 132) extends from a first side of the cylinder (30, 130) to a second side of the cylinder (30, 130) radially opposite the first side relative to the longitudinal axis of the cylinder (30, 130); and
   an actuator (36, 136) connected to the valve (28, 128) operably controlling movement of the cylinder (30, 130),
   wherein some exhaust gas flow bypasses the turbine wheel (12) by flowing through the through hole (32, 132) from the first side of the cylinder (30, 130) to the second side of the cylinder (30, 130) to control turbine work in that the turbine wheel (12) rotates at a controlled speed.

2. The turbocharger (10) of claim 1 wherein the cylinder (30) is a barrel that rotates within the tubular chamber (22) of the turbine housing (20) and the through hole (32) forms a passage for exhaust gas flow through the wastegate port (24).

3. The turbocharger (10) of claim 1 wherein the cylinder (30) is solid except for the through hole (32) which is cylindrical and fully defined by walls of the cylinder (30).

4. The turbocharger (10) of claim 1 wherein the through hole (32) is transverse and perpendicular to the longitudinal axis of the cylinder (30).

5. The turbocharger (10) of claim 1 wherein the actuator (36) operably controls rotation of the cylinder (30).

6. The turbocharger (10) of claim 1 wherein the cylinder (130) linearly reciprocates within the tubular chamber (22) of the turbine housing (20) as a piston valve, and the through hole (132) is axial to accommodate and connect to a piston rod (40) of the actuator (136), the actuator (136) operably controlling linear reciprocation of the cylinder (130), and wherein a distal end (42) of the cylinder (130) selectively blocks the wastegate port (24).

7. The turbocharger of claim 1, wherein the cylinder (30) has opposite, solid, planar ends (34) that are parallel.

8. A turbocharger (10) using exhaust gas flow to drive a turbine wheel (12) in a turbine housing (20) and a wastegate valve assembly (26, 126) to control exhaust gas flow bypassing the turbine wheel (12), the turbocharger (10) comprising:
   a tubular chamber (22) and a wastegate port (24) in the turbine housing (20) for exhaust gas flow bypassing the turbine wheel (12);
   a valve (28, 128) including a cylinder (30, 130) having a through hole (32, 132), the cylinder (30, 130) moveable within the tubular chamber (22) of the turbine housing (20) and operably associated with the wastegate port (24) for selectively blocking and unblocking the wastegate port (24), thereby controlling the exhaust gas flow; and
   an actuator (36, 136) operably controlling movement of the cylinder (30, 130),
   wherein some exhaust gas flow bypasses the turbine wheel (12) to control turbine work in that the turbine wheel (12) rotates at a controlled speed, and
   wherein the through hole (32) is transverse directly across a diameter of the cylinder (30) and wherein the actuator (136) operably controls linear reciprocation of the cylinder (30) so that the through hole (32) selectively blocks and unblocks the wastegate port (24).

9. A turbocharger (10) using exhaust gas flow to drive a turbine wheel (12) in a turbine housing (20) and a wastegate valve assembly (26, 126) to control exhaust gas flow bypassing the turbine wheel (12), the turbocharger (10) comprising:
   a tubular chamber (22) and a wastegate port (24) in the turbine housing (20) for exhaust gas flow bypassing the turbine wheel (12);
   a valve (28, 128) including a cylinder (30, 130) having a through hole (32, 132), the cylinder (30, 130) moveable within the tubular chamber (22) of the turbine housing (20) and operably associated with the wastegate port (24) for selectively blocking and unblocking the wastegate port (24) thereby controlling the exhaust gas flow; and
   an actuator (36, 136) operably controlling movement of the cylinder (30, 130),
   wherein some exhaust gas flow bypasses the turbine wheel (12) to control turbine work in that the turbine wheel (12) rotates at a controlled speed, and
   wherein the cylinder (130) linearly reciprocates within the tubular chamber (22) and the through hole (32) is an external radial groove.

10. A turbocharger (10) using exhaust gas flow to drive a turbine wheel (12) in a turbine housing (20) and a wastegate valve assembly (26) to control exhaust gas flow bypassing the turbine wheel (12), the turbocharger (10) comprising:
    a tubular chamber (22) and a wastegate port (24) for exhaust gas flow bypassing the turbine wheel (12);
    a roller barrel valve (28) including a cylinder (30) having a cylindrical through hole (32) defined circumferentially by walls of the cylinder (30) and arranged transverse to the cylinder (30) rotatable within the tubular chamber (22) of the turbine housing (20) and the through hole (32) operably associated with the wastegate port (24) for selectively allowing exhaust gas flow through the wastegate port (24) via the through hole (32); and
    an actuator (36) connected to the roller barrel valve (28) for operably controlling rotation of the cylinder (30),
    wherein some exhaust gas flow bypasses the turbine wheel (12) to control turbine work in that the turbine wheel (12) rotates at a controlled speed.

11. The turbocharger (10) of claim 10 wherein the through hole (32) is transverse perpendicular to the longitudinal axis of the cylinder (30).

12. The turbocharger of claim 10, wherein the cylinder (30) has opposite, solid, planar ends (34) that are parallel.

13. A turbocharger (10) using exhaust gas flow to drive a turbine wheel (12) in a turbine housing (20) and a wastegate valve assembly (126) to control exhaust gas flow bypassing the turbine wheel (12), the turbocharger (10) comprising:
    a tubular chamber (22) and a wastegate port (24) in the turbine housing (20) for exhaust gas flow bypassing the turbine wheel (12);
    a piston valve (128) including a cylinder (130) that linearly reciprocates within the tubular chamber (22) of the turbine housing (20) with a distal end (42) of the cylinder (130) operably associated with the wastegate port (24) that selectively blocks and unblocks the wastegate port (24) thereby controlling the exhaust gas flow, and the cylinder (30) has a solid planar end; and
    a linear actuator (136) connected to the piston valve (128) for operably controlling reciprocation of the cylinder (130),
    wherein some exhaust gas flow bypasses the turbine wheel (12) to control turbine work in that the turbine wheel (12) rotates at a controlled speed.

14. The turbocharger of claim 13, wherein the cylinder (130) has an external radial groove for selectively opening the wastegate port (24).

* * * * *